(12) United States Patent
Johnson et al.

(10) Patent No.: US 8,328,057 B2
(45) Date of Patent: Dec. 11, 2012

(54) ROOF RACK WITH STOWABLE CROSSRAILS

(75) Inventors: Jeffrey R. Johnson, West Bloomfield, MI (US); Desmond P. Jamieson, Toronto (CA); Alexander C. Laursen, Berkley, MI (US)

(73) Assignee: Magna International Inc., Aurora, Ontario (CA)

( * ) Notice: Subject to any disclaimer, the term of this patent is extended or adjusted under 35 U.S.C. 154(b) by 573 days.

(21) Appl. No.: 12/386,186

(22) Filed: Apr. 15, 2009

(65) Prior Publication Data

US 2010/0264179 A1    Oct. 21, 2010

(51) Int. Cl.
*B60R 9/045* (2006.01)

(52) U.S. Cl. .................................................. 224/321

(58) Field of Classification Search .............. 224/321, 224/310, 314, 315, 320, 325, 322, 326, 548, 224/554; 410/150, 8
See application file for complete search history.

(56) References Cited

U.S. PATENT DOCUMENTS

| | | | | |
|---|---|---|---|---|
| 1,745,982 A | * | 2/1930 | Copony | 410/25 |
| 4,487,348 A | * | 12/1984 | Mareydt | 224/321 |
| 4,489,868 A | * | 12/1984 | Thirion | 224/321 |
| 4,969,784 A | * | 11/1990 | Yanke | 410/104 |
| 5,139,375 A | * | 8/1992 | Franchuk | 410/105 |
| 5,340,007 A | | 8/1994 | Jeuffray et al. | |
| 5,377,890 A | | 1/1995 | Brunner et al. | |
| 5,511,709 A | * | 4/1996 | Fisch | 224/321 |
| 6,286,739 B1 | * | 9/2001 | Stapleton | 224/321 |
| 7,090,103 B2 | * | 8/2006 | Aftanas et al. | 224/321 |
| 7,204,396 B1 | * | 4/2007 | Stapleton | 224/326 |
| 7,387,482 B2 | * | 6/2008 | Kmita et al. | 410/150 |
| 7,537,258 B2 | * | 5/2009 | Quijano et al. | 296/37.8 |
| 2006/0163297 A1 | | 7/2006 | Moreau | |

FOREIGN PATENT DOCUMENTS

FR    2794702 A1 * 12/2000

* cited by examiner

*Primary Examiner* — Justin Larson (74) *Attorney, Agent, or Firm* — Miller Canfield (57) ABSTRACT

A roof rack assembly is provided for a motor vehicle roof. The roof rack assembly includes a support member adapted to be fixedly secured to the roof. The support member includes first and second flanges extending out therefrom. A crossrail is releasably coupled to the support member for movement between a stowed position and a deployed position. The crossrail is engageable with the first flange when in the stowed position and engageable with the second flange when in the deployed position.

5 Claims, 8 Drawing Sheets

ROOF RACK WITH STOWABLE CROSSRAILS

FIELD OF THE INVENTION

The invention relates to a roof rack assembly for a motor vehicle. More particularly, this invention relates to a roof rack assembly including crossrails movable between a stowed position and a deployed position.

DESCRIPTION OF RELATED ART

Roof racks are commonly secured to or mounted above a roof of a motor vehicle for the storage and transport of articles. The storage of articles above the roof is beneficial in that additional passenger or storage space within an interior compartment of the motor vehicle is created. Roof racks are particularly useful for storing and transporting larger articles, such as bicycles and canoes, which would not otherwise fit within the interior compartment of the motor vehicle.

Typically, roof racks include a pair of spaced apart side rails extending longitudinally along the roof, and a pair of cross rails extending transversely across the roof between the pair of spaced apart side rails. Together, the side rails and cross rails provide a plurality of anchor points for securing articles to the roof rack. The cross rails generate, however, considerable wind noise during motor vehicle operation. While such wind noise is generally acceptable when the cross rails are being utilized to store and transport articles, the same amount of wind noise is unacceptable during those instances when articles are not being secured to the cross rails.

SUMMARY

According one aspect of the invention, a roof rack assembly for a roof of a motor vehicle includes a support member adapted to be fixedly secured to the roof. The support member includes first and second flanges extending out therefrom. A crossrail is releasably coupled to the support member for movement between a stowed position and a deployed position. The crossrail is engageable with the first flange in the stowed position and engageable with the second flange in the deployed position.

According to another aspect of the invention, a roof rack assembly for a roof of a motor vehicle includes a support member adapted to be fixedly secured to the roof. The support member includes first and second flanges extending out therefrom. A crossrail includes a stanchion fixedly secured thereto and has a clamp assembly formed at one end for selectively engaging the first and second flanges. The clamp assembly is engageable with the first flange to retain the crossrail in a stowed position and engageable with the second flange to retain the crossrail in a deployed position.

According to yet another aspect of the invention, a roof rack assembly for a roof of a motor vehicle includes a support member adapted to be fixedly secured to the roof and including an end surface and an inboard surface. The support member includes a mounting flange extending continuously between the end surface and the inboard surface. A crossrail is releasably coupled to the mounting flange for movement between a stowed position and a deployed position.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENTS

Figure 1:
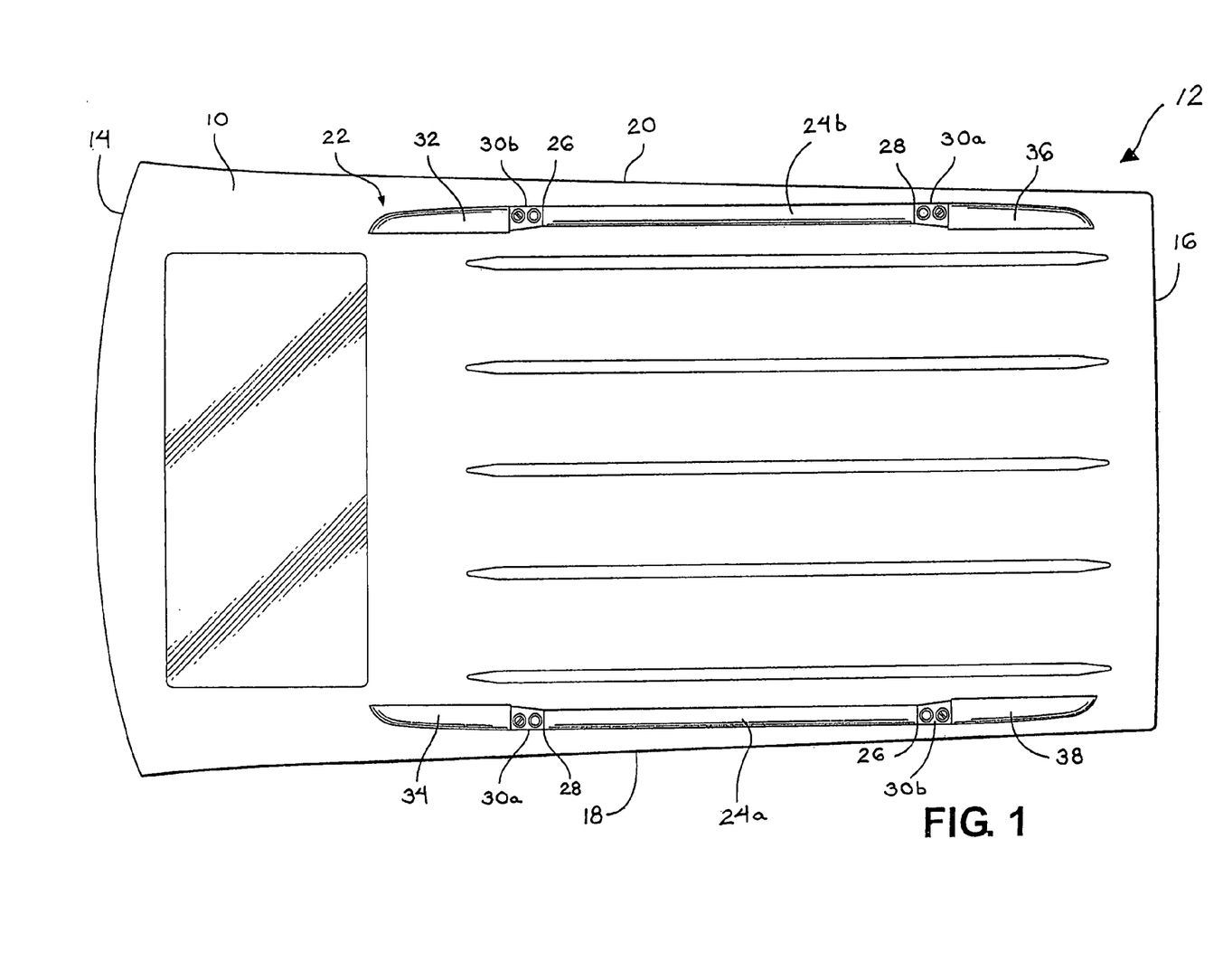
FIG. 1 is a top view of a roof rack assembly according to one embodiment including crossrails in a stowed position.
Figure 2:
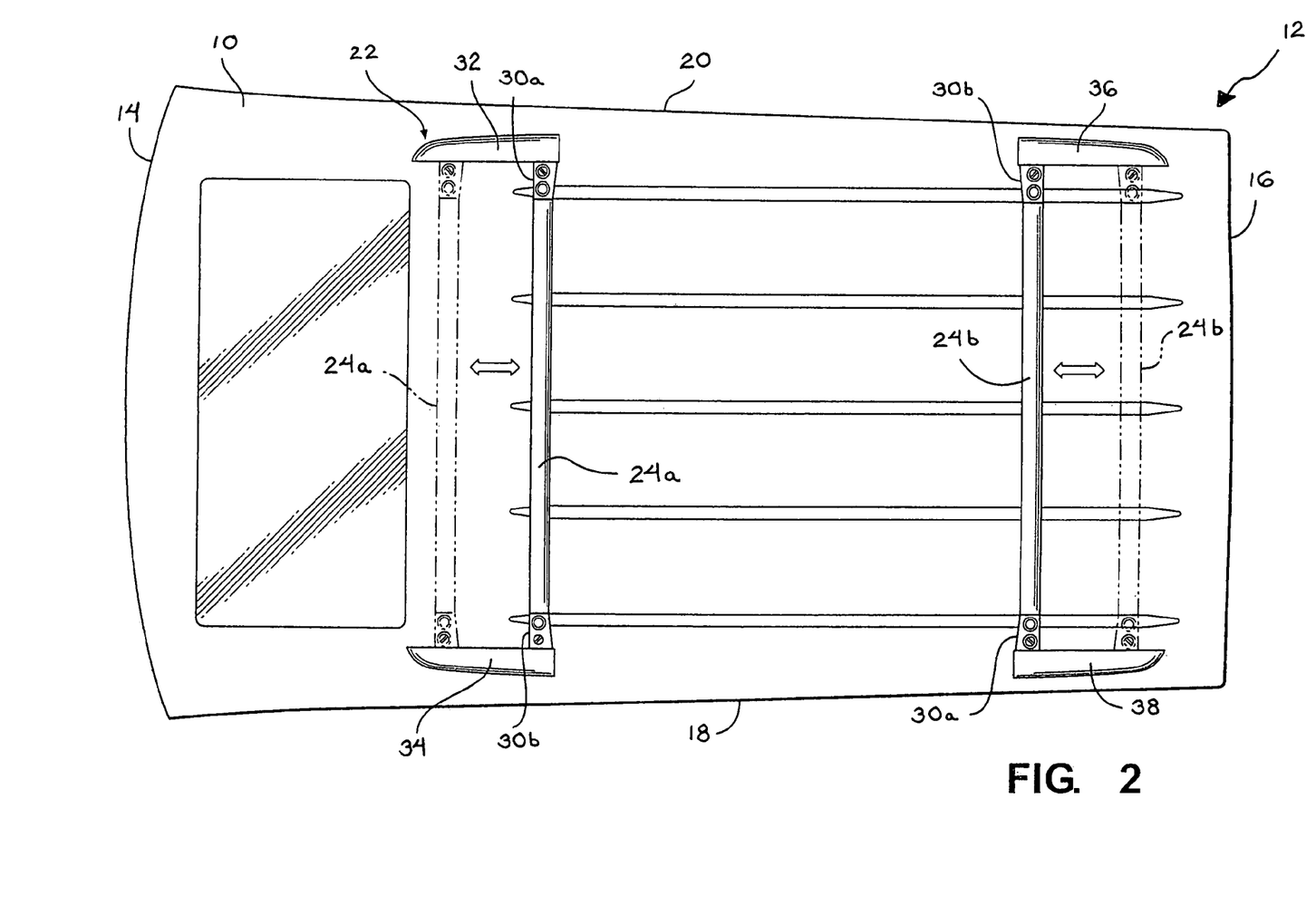
FIG. 2 is a top view of the roof rack assembly including crossrails in a deployed position.

Referring to FIGS. 1 and 2, a roof 10 of a motor vehicle 12 includes a front edge 14, an opposing rear edge 16, and a pair of spaced apart sides 18, 20 extending longitudinally between the front 14 and rear 16 edges.

A roof rack assembly, generally shown at 22, is mounted along the roof 10 for storing articles thereabove. The roof rack assembly 22 includes crossrails 24*a*, 24*b* movable between a stowed position, shown in FIG. 1, and a deployed or cross car position, shown in FIG. 2. In the stowed position, the crossrails 24*a*, 24*b* extend longitudinally along the roof 10. In the deployed position, the crossrails 24*a*, 24*b* extend laterally across the roof 10 between the sides 18, 20 thereof. Each of the crossrails 24*a*, 24*b* extends between a pair of opposing ends 26, 28. A stanchion 30*a*, 30*b* is fixedly secured at each end 26, 28 of the crossrails 24*a*, 24*b*.

The roof rack assembly 22 includes support members 32, 34, 36, 38 adapted to be fixedly secured to the roof 10. The support members 32, 34, 36, 38 retain the crossrails 24*a*, 24*b* in the stowed and deployed positions. In one embodiment, two 32, 34 of the support members are front support members mounted toward the front edge 14 of the roof 10, and two 36, 38 of the support members are rear support members mounted adjacent the rear edge 16 of the roof 10. It is, however, appreciated that the particular location of the support members 32, 34, 36, 38 along the roof 10 may vary.

It is contemplated that the support members 32, 38 could be identical to one another and that the support members 34, 36 could be identical to one another. The ability to use two identical support members 32, 38 and 34, 36 depends upon the sweep of the roof 10. Because the roof 10 varies from vehicle to vehicle, it is appreciated that a base gasket 40, which is directly mounted to the roof 10, can be utilized to take up any variances between different locations along the roof 10.

Figure 4:
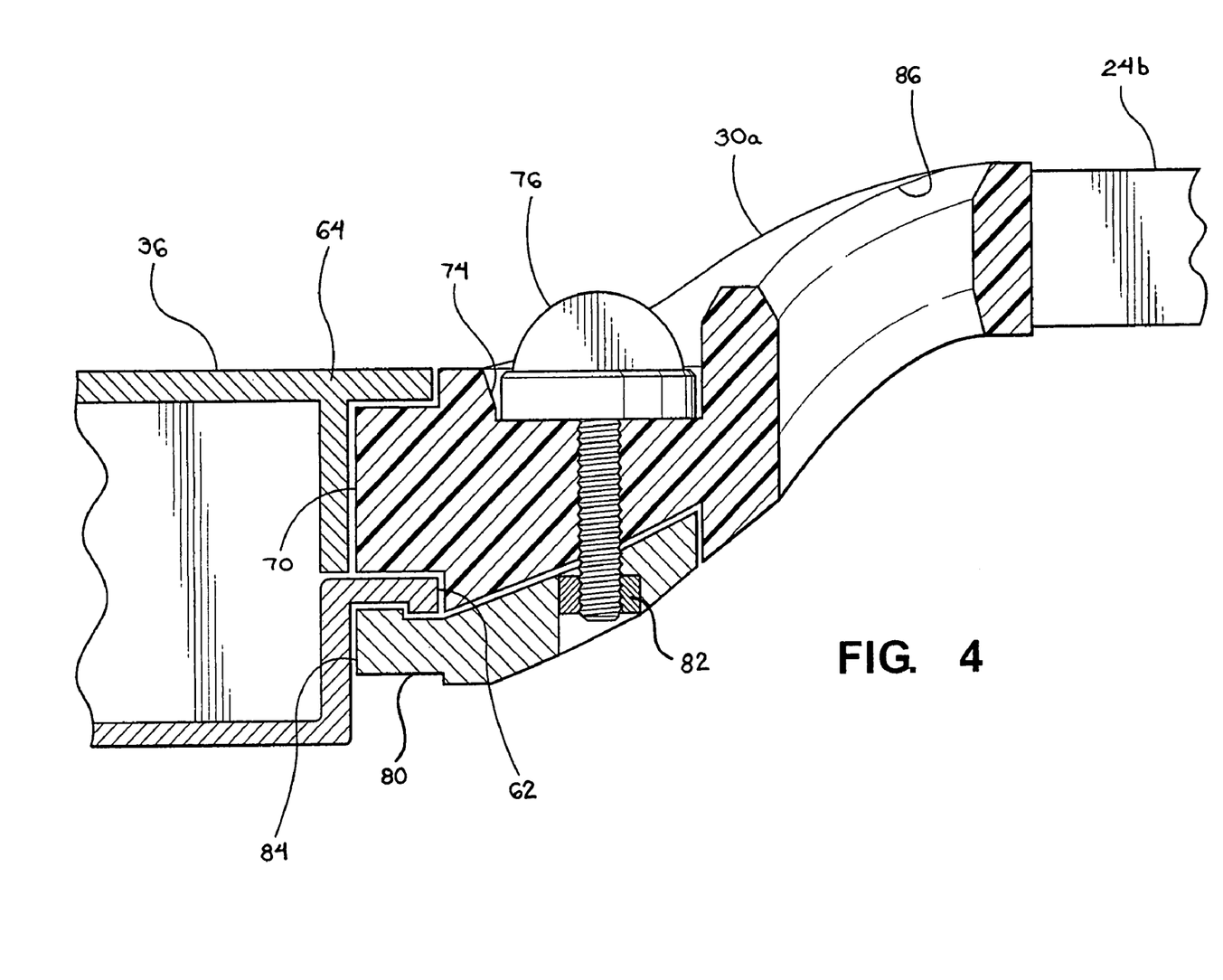
FIG. 4 is a cross-sectional view taken along lines 4-4 in FIG. 3.
Figure 5:
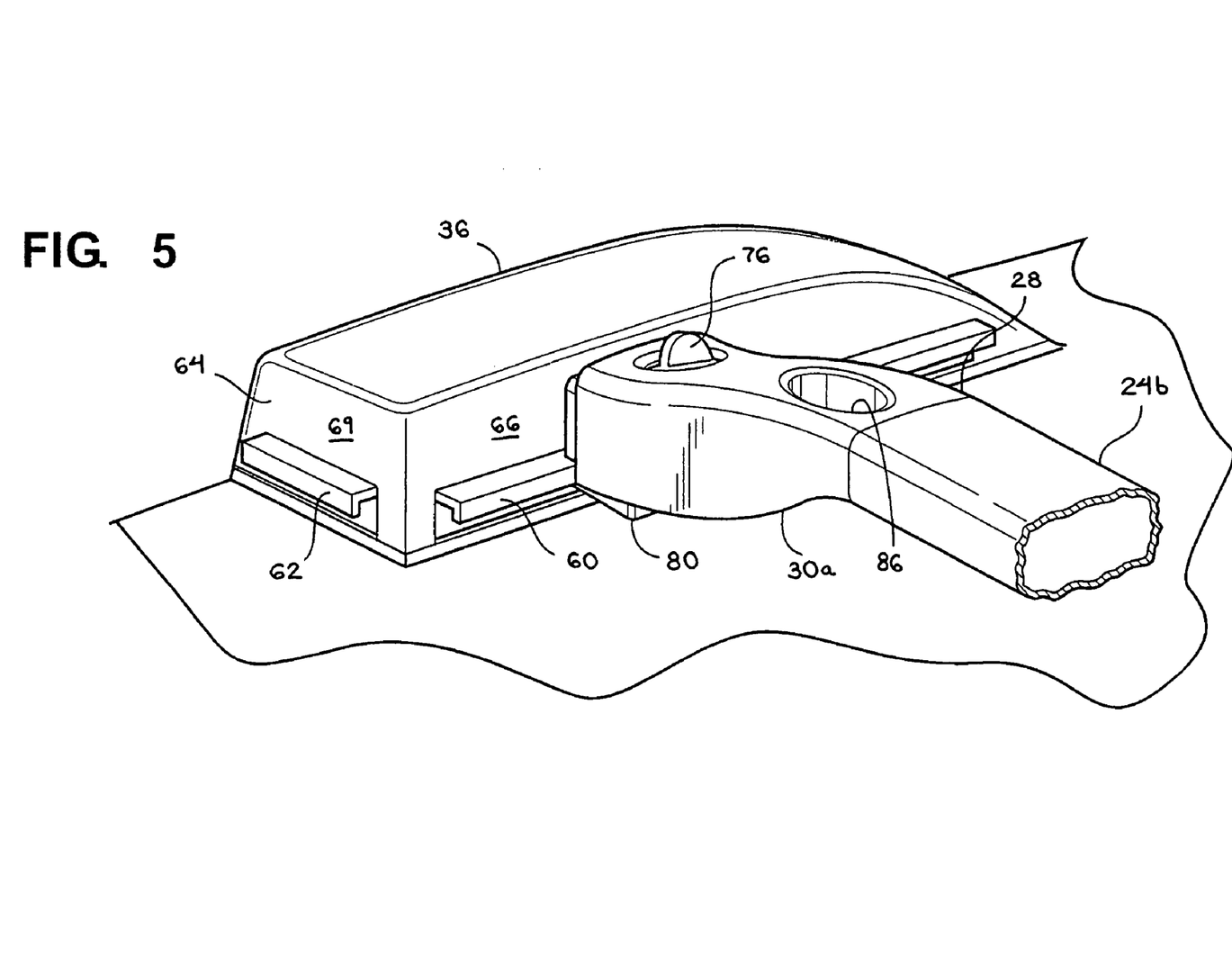
FIG. 5 is a front perspective view of the support member including one of the crossrails mounted thereto in the deployed position.
Figure 6:
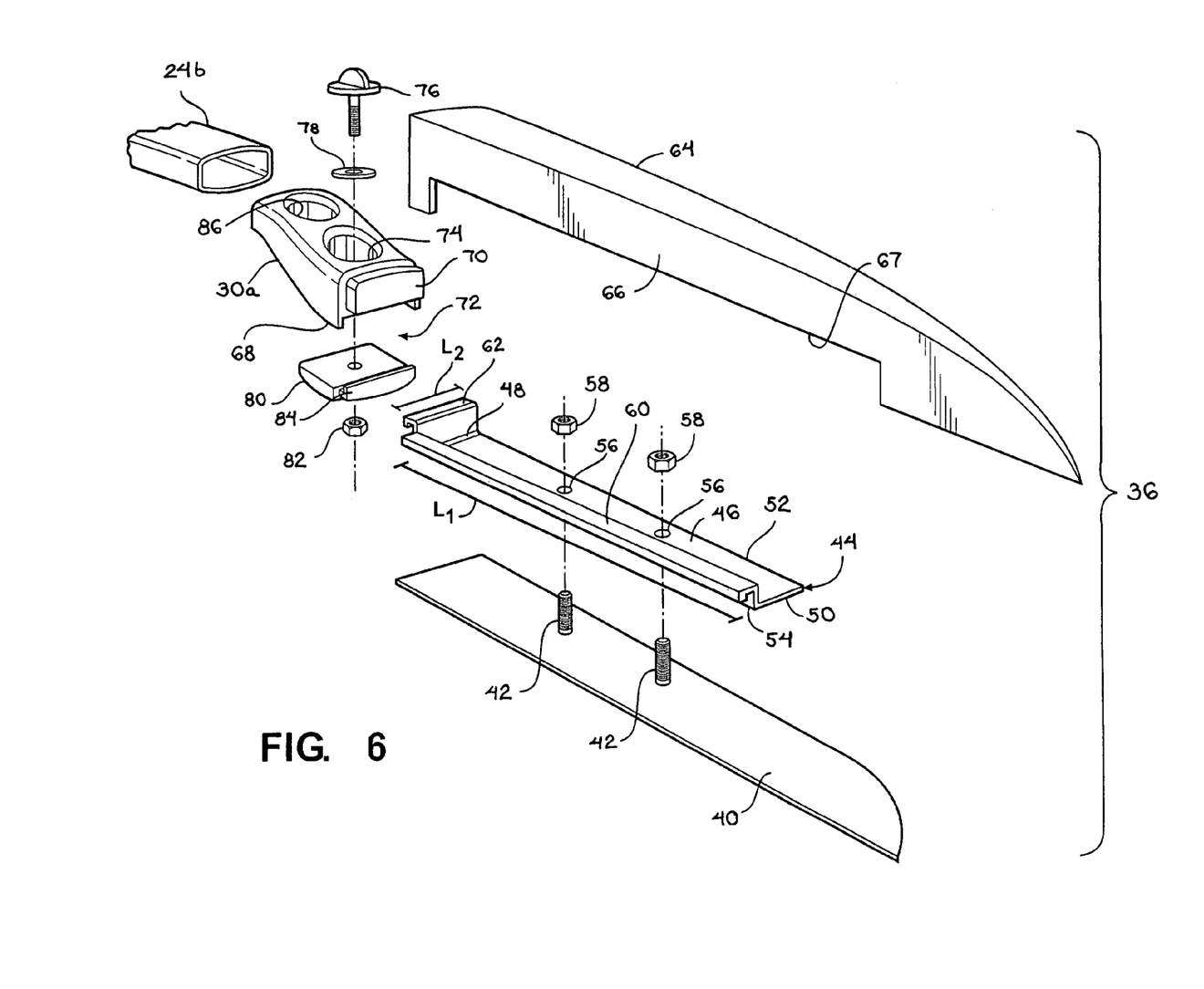
FIG. 6 is an exploded perspective view of the support member and a clamping assembly for mounting one of the crossrails to the support member.

Referring to FIGS. 3 through 6, the engagement between one 36 of the support members and one end 28 of one 24*b* of the crossrails is shown in greater detail; It is appreciated that although only one 36 of the support members and one 24*b* of the crossrails is shown in FIGS. 3 through 6, the following description applies to the rest of the support members 32, 34, 38 and the other crossrail 24*a*. Referring to FIG. 6, the support member 36 includes the base gasket 40 that is adapted to abut the roof 10. The base gasket 40 is formed from nylon or like material such that the base gasket 40 will not scratch the roof 10. The base gasket 40 receives a pair of fastener studs 42 therethrough. The pair of fastener studs 42 is fixedly secured to the roof 10 to facilitate attachment of the support member 36 thereto.

The support member 36 includes a base, generally indicated at 44, positioned above the base gasket 40. The base 44 includes a floor surface 46 that extends longitudinally between a first end 48 and a second end 50. The floor surface 46 also extends laterally between an outboard end 52 and an inboard end 54. The floor surface 46 defines a pair of apertures 56 for receiving the respective pair of fastener studs 42 therethrough. A pair of nuts 58 threadedly engages the pair of fastening studs 42 to secure the base 44 and the base gasket 50 to the roof 10. It is appreciated that in the alternative the pair of nuts 58 could be fixedly secured to the roof 10 and the pair of fastener studs 42 could be driven into the respective pair of nuts 58 to secure the base 44 and the base gasket 40 to the roof 10.

The base 44 includes an inboard flange 60 extending out from the inboard end 54. The inboard flange 60 defines a length $L_1$ that extends between the first 48 and second 50 ends of the base 44. It is appreciated that the particular length $L_1$ of the inboard flange 60 may vary. In one embodiment, the inboard flange 60 is generally L-shaped. The base 44 also includes an end flange 62 extending out from the first end 48. The end flange 62 defines a length $L_2$ that extends laterally between the outboard end 52 and the inboard end 54 of the base 44. It is, however, appreciated that the particular length $L_2$ of the end flange 62 may vary. In one embodiment, the end flange 62 is generally L-shaped.

The support member 36 also includes a cover 64 that snaps into place over the base 44. The cover 64 defines an inboard surface 66 of the support member 36 that closes off the interior of the support member 36. The cover 64 also defines an end surface 69 of the support member 36. The inboard surface 66 includes at least one cutout 67 to allow at least one of the inboard 60 and end 62 flanges to extend out past the inboard surface 66 and the end surface 69 respectively.

Figure 3:
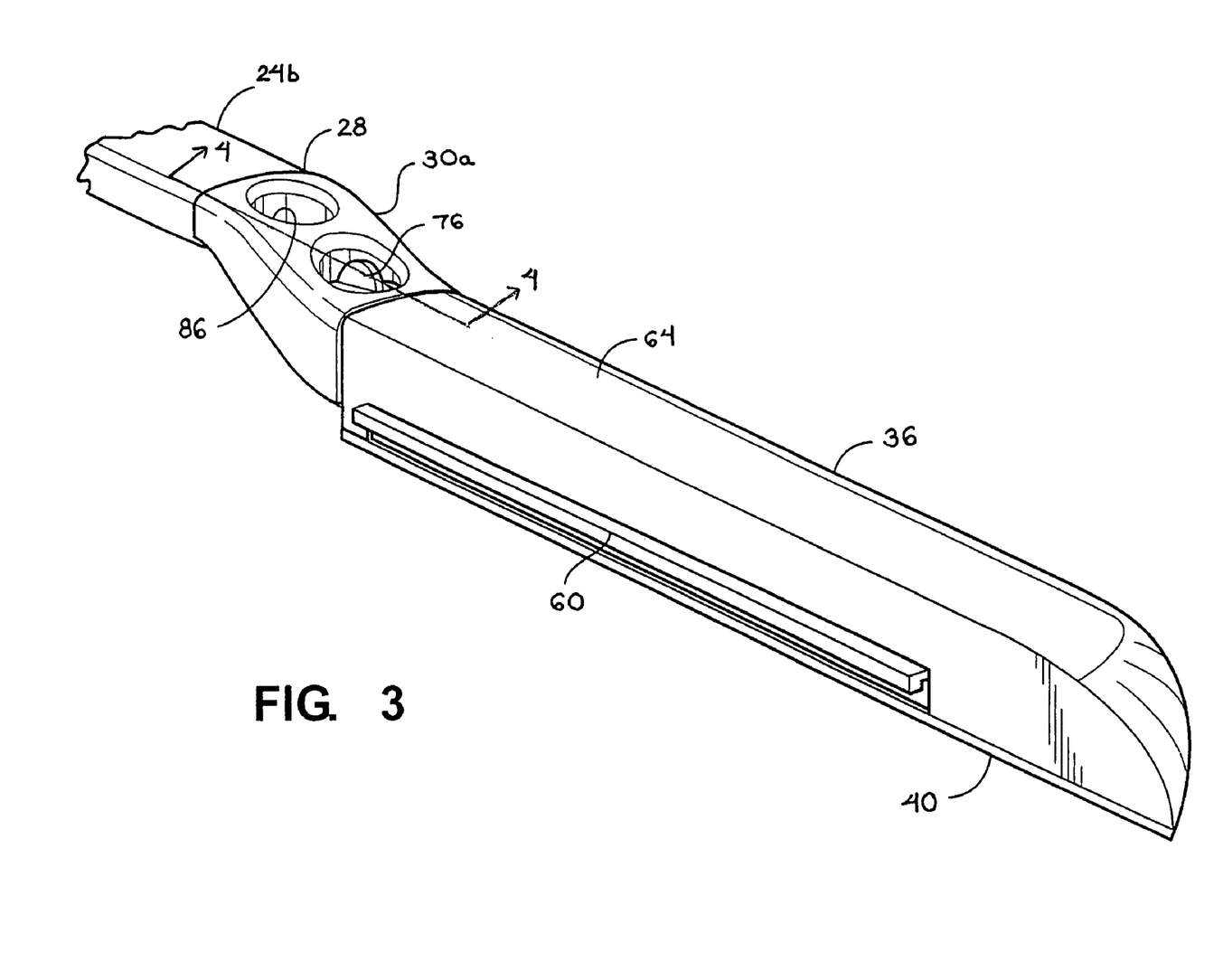
FIG. 3 is a rear perspective view of a support member including one of the crossrails mounted thereto in the stowed position.

The inboard flange 60 and the end flange 62 on the support member 36 selectively receive the crossrail 24b therealong to retain the crossrail 24b in the respective deployed and stowed positions. More specifically, when the crossrail 24b is in the stowed position, as shown in FIGS. 3 and 4, the crossrail 24b is mounted along the end flange 62 of the support member 36. And when the crossrail 24b is in the deployed position, as shown in FIG. 5, the crossrail 24b is mounted along the inboard flange 60 of the support member 36.

The stanchion 30a at the end 28 of the crossrail 24b provides for the selective locking engagement between the crossrail 24b and the support member 36. An outer end 68 of the stanchion 30a forms an upper clamp 70 of a clamp assembly 72. The upper clamp 70 defines an opening 74 for receiving a screw 76 and a washer 78. The clamp assembly 72 also includes a lower clamp 80 that is mounted to the upper clamp 70 at the outer end 68. A nut 82 is fixedly secured to the lower clamp 80 and threadedly engages the screw 76. Thus, turning the screw 76 in opposing first and second directions moves the lower clamp 80 towards and away from the upper clamp 70. The lower clamp 80 includes a locking flange 84 that closes around the inboard flange 60 and the end flange 62 when the crossrail 24b is in the respective deployed and stowed positions. The locking flange 84 is shaped to complement the shape of the inboard 60 and end 62 flanges to ensure a tight engagement therebetween. In one embodiment, the locking flange 84 is generally L-shaped. Thus, when the clamp assembly 72 is tightened around one of the inboard 60 and end 62 flanges, the locking flange 84 lockingly engages one of the inboard 60 and end 62 flanges to ensure that the crossrail 24b is held securely in place in either the stowed or deployed positions.

The stanchion 30a further includes a tie-down loop 86 that serves as a tie-down point for mounting any of numerous aftermarket accessories to the roof rack assembly 22.

In operation, starting with the crossrails 24a, 24b in the stowed position, as shown in FIG. 1, a user turns the screw 76 at each end 26, 28 of the crossrails 24a, 24b to loosen the clamp assembly 72 at each stanchion 30a. As a result, the user slides the crossrails 24a, 24b out of the stowed position and repositions the crossrails 24a, 24b into the deployed or cross car position. In the deployed position, one crossrail 24a extends between the front support members 32, 34, and the other crossrail 24b extends between the rear support members 36, 38 at the rear edge 16 of the roof 10, as shown in FIG. 2. Each crossrail 24a, 24b may be mounted in any of numerous locations along the length $L_1$ of the inboard flange 60 of the support members 32, 34, 36, 38. Thus, the distance between the crossrails 24a, 24b in the deployed position may be adjusted to be closer to one another or farther apart from one another. Once the crossrails 24a, 24b have been placed in their desired location along the inboard flanges 60, the screw 76 is tightened and the clamp assembly 72 closes against the inboard flange 60 to facilitate a fixed engagement of the crossrails 24a, 24b to the support members 32, 34, 36, 38.

To move the crossrails 24a, 24b from the deployed position to the stowed position, the user turns the screw 76 at each end 26, 28 of the crossrails 24a, 24b to loosen the clamp assembly 72 of each stanchion 30a. As a result, the user slides the crossrails 24a, 24b out of the deployed position and repositions the crossrails 24a, 24b into the stowed position. More specifically, one of the crossrails 24a is secured between two 34, 38 of the support members, and the other crossrail 24b is secured between the other two 32, 36 support members, as shown in FIG. 1. Once the crossrails 24a, 24b are placed in the stowed position, the screw 76 on each stanchion 30a is tightened so that each clamp assembly 72 closes against one of the end flanges 62 to facilitate a fixed engagement of the crossrails 24a, 24b to the support members 32, 34, 36, 38.

Figure 7:
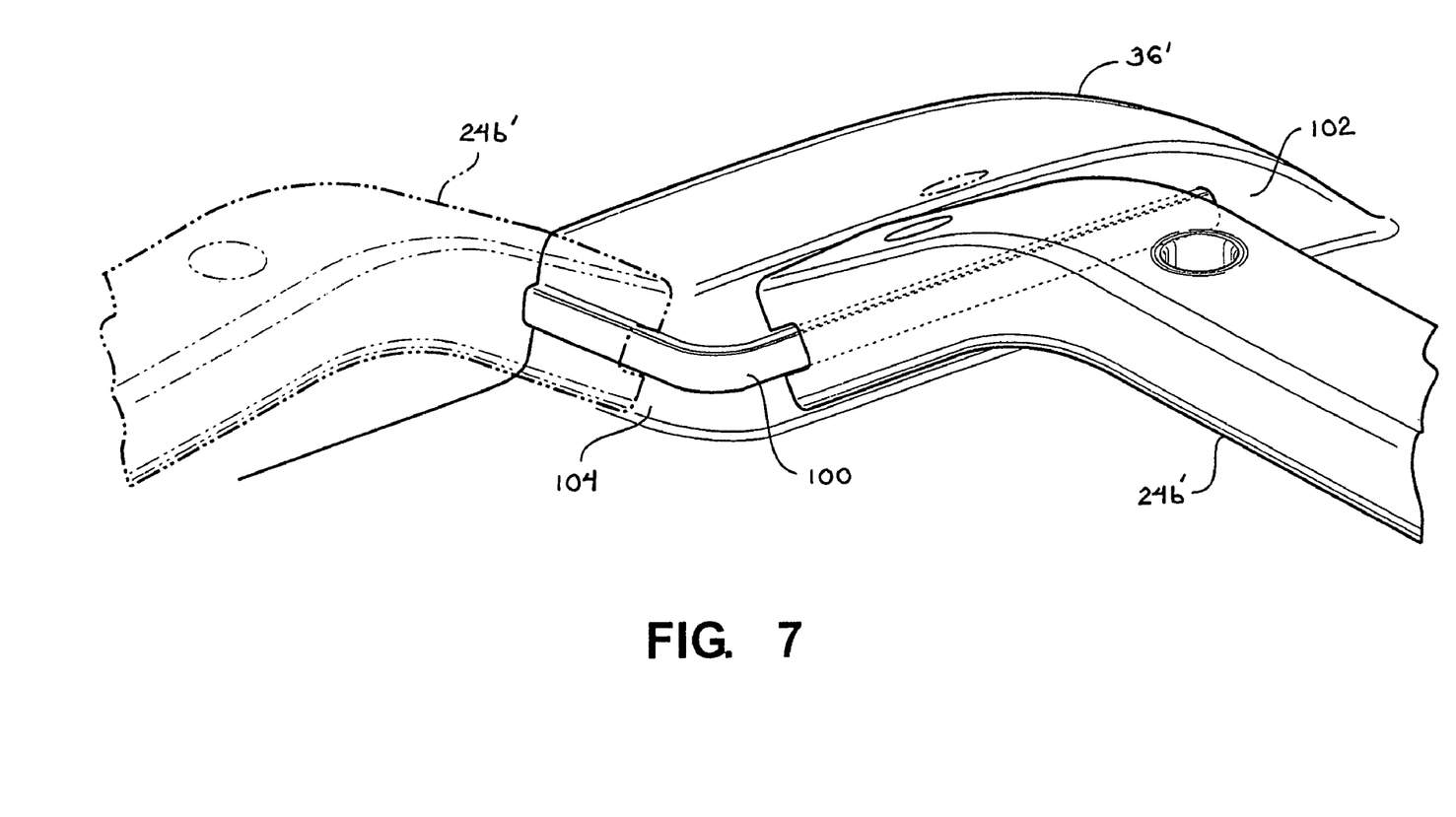
FIG. 7 is a perspective view of a support member according to another embodiment.

Referring to FIG. 7, wherein primed reference numerals represent similar elements as those set forth above, the support member 36' in another embodiment includes a mounting flange 100 that extends continuously from an inboard surface 102 of the support member 36' to an end surface 104 thereof.

Figure 8:
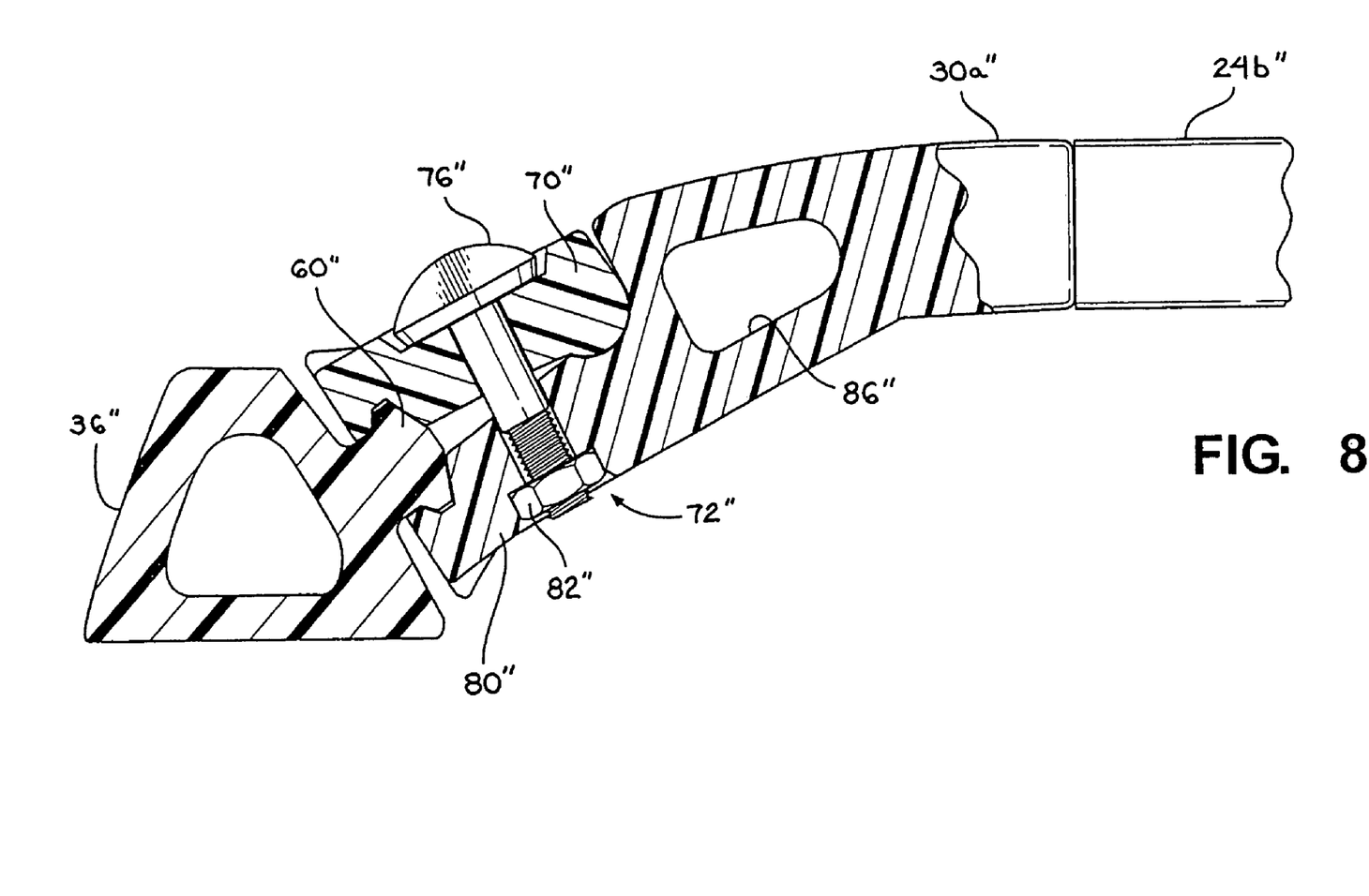
FIG. 8 is a cross-sectional view of a support member according to yet another embodiment.

Referring to FIG. 8, wherein double-primed reference numerals represent similar elements as those set forth above, the roof rack assembly 22" in yet another embodiment includes the lower clamp 80" of the clamp assembly 72" formed along the outer end 68" of the stanchion 30a". The nut 82" is captured inside the lower clamp 80". The upper clamp 70" is coupled to the lower clamp 80" by the screw 76". Thus, turning the screw 76" will move the upper clamp 70" relative to the lower clamp 80" to either loosen or tighten the clamp assembly 72".

In addition, the tie-down loop 86" is positioned along the stanchion 30a" in such a way as to be open to either side of the crossrail 24b".

The invention has been described in an illustrative manner. It is to be understood that the terminology, which has been used, is intended to be in the nature of words of description rather than of limitation. Many modifications and variations of the invention are possible in light of the above teachings.

Therefore, within the scope of the appended claims, the invention may be practiced other than as specifically described.

What is claimed:

1. A roof rack assembly for a roof of a motor vehicle, said roof rack assembly comprising:
 a support member adapted to be fixedly secured to the roof and including an end surface and an inboard surface, wherein said end surface and said inboard surface are generally perpendicular, said support member including a mounting flange extending continuously between said end surface and said inboard surface; and
 a crossrail selectively slidably coupled to said mounting flange for sliding movement of said crossrail without releasing said crossrail from said mounting flange between a stowed position, wherein said crossrail is coupled with said mounting flange adjacent said end surface, and a deployed position, wherein said crossrail is coupled with said mounting flange adjacent said inboard surface.

2. A roof rack assembly as set forth in claim 1 wherein said crossrail includes a clamp assembly formed at one end thereof for lockingly engaging said mounting flange to maintain said crossrail in said stowed and deployed positions.

3. A roof rack assembly as set forth in claim 2 wherein said deployed position of said crossrail is adjustable along said mounting flange.

4. A roof rack assembly as set forth in claim 3 including a cover fixedly secured to said support member, wherein said cover includes a cutout for receiving said mounting flange therethrough.

5. A roof rack assembly as set forth in claim 4 wherein said mounting flange is generally L-shaped.

* * * * *